(12) United States Patent
Yoshida et al.

(10) Patent No.: US 6,362,470 B1
(45) Date of Patent: Mar. 26, 2002

(54) OPTICAL SCANNING APPARATUS AND IMAGE FORMING APPARATUS AND ELECTROPHOTOGRAPHIC PRINTER USING SUCH SCANNING APPARATUS

(75) Inventors: Hiroki Yoshida, Tokyo; Yoshihiro Ishibe, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/488,534

(22) Filed: Jan. 21, 2000

(30) Foreign Application Priority Data

Jan. 26, 1999 (JP) .............................. 11-017463

(51) Int. Cl.[7] .................................................. H01J 3/14
(52) U.S. Cl. ...................................... 250/235; 347/235
(58) Field of Search ................................ 250/235, 236, 250/208.1, 216, 207.5; 358/486; 359/196, 197, 212, 216; 347/235, 234, 248, 250

(56) References Cited

U.S. PATENT DOCUMENTS

| | | | |
|---|---|---|---|
| 4,933,549 A | 6/1990 | Fujioka et al. | 250/235 |
| 5,663,558 A | 9/1997 | Sakai | 250/234 |
| 5,859,720 A | 1/1999 | Ishibe | 359/196 |
| 5,920,680 A * | 7/1999 | Inoue et al. | 395/101 |
| 5,995,131 A | 11/1999 | Fujibayashi et al. | 347/258 |

FOREIGN PATENT DOCUMENTS

| | | |
|---|---|---|
| JP | 2-188713 | 7/1990 |
| JP | 5-44580 | 2/1993 |
| JP | 8-76041 | 3/1996 |
| JP | 8-179228 | 7/1996 |
| JP | 9-54263 | 2/1997 |
| JP | 9-197307 | 7/1997 |

\* cited by examiner

*Primary Examiner*—Que T. Le
(74) *Attorney, Agent, or Firm*—Fitzpatrick, Cella, Harper & Scinto

(57) ABSTRACT

An optical scanning apparatus is capable of scanning a surface with a plurality of fluxes of light along a principal scanning direction. In the apparatus, a plurality of fluxes of light are emitted by a plurality of light sources arranged at intervals along an auxiliary scanning direction perpendicular to the principal scanning direction. The plurality of fluxes of light are lead to an optical deflector via an optical system for incident light and deflected by the optical deflector. Most part of the deflected fluxes of light are lead to the surface via an imaging optical system for scanning the surface, while small part of the deflected fluxes of light are lead to a photodetector to generate a synchronizing signal for controlling the timing of the scanning start of each of the fluxes of light. A slit is arranged between the optical deflector and the photodetector and the slit is inclined relative to the auxiliary scanning direction, whereby the scanning start timings for the plurality of fluxes of light are adjusted. The optical scanning apparatus is used in an image forming apparatus or an electrophotographic printer.

39 Claims, 14 Drawing Sheets

OPTICAL SCANNING APPARATUS AND IMAGE FORMING APPARATUS AND ELECTROPHOTOGRAPHIC PRINTER USING SUCH SCANNING APPARATUS

BACKGROUND OF THE INVENTION

1. Field of the Invention

This invention relates to an optical scanning apparatus adapted to scan a surface to be scanned by means of a plurality of fluxes of light and also to an image forming apparatus such as a laser beam printer or a digital copying machine and an electrophotographic printer using such an optical scanning apparatus.

2. Related Background Art

In many conventional optical scanning apparatus that are used in image forming apparatus, the flux of light emitted from a light source is led to a deflection means by way of an optical means for incident light and the flux of light deflected by the deflection means is focussed on the surface to be scanned to form a spot of light there, which is then used to scan the surface by a scanning optical means.

In the course of technological development in recent years in the field of image forming apparatus, seeking for higher performances and higher functions, there has been and still is a strong demand for optical scanning apparatus that are compact and operate at high speed. An idea for meeting the demand for high speed operation is the use of a plurality of light sources. On the other hand, the demand for down-sizing may be met by converging the flux of light to be led to the deflection means along the principal scanning direction of the scanning optical means.

Japanese Patent Application Laid-Open No. 9-54263 discloses an optical scanning apparatus proposed to meet the demand for high speed operation. In the proposed optical scanning apparatus, a plurality of fluxes of light are emitted in a linear array from a single multi-beam laser chip. Japanese Patent Application Laid-Open No. 5-45580 discloses an optical scanning apparatus proposed to meet the demand for down-sizing. In the proposed optical scanning apparatus, the flux of light emitted from a light source is converged to a point of spontaneous convergence located behind the surface to be scanned by means of a focussing optical system.

However, optical scanning apparatus using a plurality of light sources are accompanied by the problem that the scanning start points of the fluxes of light from the light sources can be displaced from each other. While this problem may be dissolved by providing different time lags for the synchronizing signal to be applied to the light sources in order to cause the latter to start their respective scanning operations with the time lags. However, the time lags will have to be provided electrically or by means of software for each light source to make the overall configuration very complex and limit the scanning speed of the apparatus.

On the other hand, optical scanning apparatus designed to converge the fluxes of light led to the deflection means along the principal scanning direction utilize a rotary polyhedral mirror having its center of rotation located off the deflection plane as deflection means. If the fluxes of light from the optical means for incident light are convergent or divergent in such an arrangement, while the scanning start points can be aligned along the principal scanning direction, the deflection points may be shifted relative to the optical axis of the optical means for incident light to shift the points of spontaneous convergence as the rotary polyhedral mirror rotate.

Thus, an image forming apparatus comprising such an optical scanning apparatus may have the spot images of the light sources displaced relative to the principal scanning direction as the rotary mirror rotates to make it impossible to form a high quality image.

SUMMARY OF THE INVENTION

In view of the technological problems of the prior art, it is therefore the object of the present invention to provide an optical scanning apparatus that can prevent any displacement of the scanning start points of the plurality of fluxes of light emitted from so many light sources from occurring by a simple means and also to provide an image forming apparatus and an electrophotographic printer comprising such an optical scanning apparatus.

In an aspect of the present invention, the above object is achieved by providing an optical scanning apparatus for scanning a surface to be scanned with a plurality of fluxes of light along a principal scanning direction, the apparatus comprising:

a plurality of light sources arranged at intervals along an auxiliary scanning direction perpendicularly to the principal scanning direction;

an optical deflector for deflecting the plurality of fluxes of light emitted from the plurality of light sources;

an optical system for incident light adapted to lead the plurality of fluxes of light emitted from the plurality of light sources to the optical deflector;

an imaging optical system for forming images of the plurality of fluxes of light deflected by the optical deflector on the surface to be scanned;

a photodetector for detecting part of the plurality of fluxes of light deflected by the optical deflector and outputting a synchronizing signal for controlling the timing of the scanning start of each of the fluxes of light; and a slit arranged between the optical deflector and the photodetector;

the slit being inclined relative to the auxiliary scanning direction.

In another aspect of the invention, there is provided an image forming apparatus for forming an image by scanning the surface to be imaged with a plurality of fluxes of light along a principal scanning direction, the apparatus comprising:

a plurality of light sources arranged at intervals along an auxiliary scanning direction perpendicular to the principal scanning direction;

a central processing unit for driving the plurality of light sources independently relative to each other according to an image signal;

an optical deflector for deflecting the plurality of fluxes of light emitted from the plurality of light sources;

an optical system for incident light adapted to lead the plurality of fluxes of light emitted from the plurality of light sources to the optical deflector;

an imaging optical system for forming images of the plurality of fluxes of light deflected by the optical deflector on the surface to be imaged;

a photodetector for detecting part of the plurality of fluxes of light deflected by the optical deflector and outputting a synchronizing signal for controlling the timing of the scanning start of each of the fluxes of light; and a slit arranged between the optical deflector and the photodetector;

the slit being inclined relative to the auxiliary scanning direction.

In still another aspect of the invention, there is provided an electrophotographic printer for forming an image by scanning the surface of a photosensitive body with a plurality of fluxes of light along a principal scanning direction, the apparatus comprising:

a plurality of light sources arranged at intervals along an auxiliary scanning direction perpendicular to the principal scanning direction;

a central processing unit for driving the plurality of light sources independently relative to each other according to an image signal;

an optical deflector for deflecting the plurality of fluxes of light emitted from the plurality of light sources;

an optical system for incident light adapted to lead the plurality of fluxes of light emitted from the plurality of light sources to the optical deflector;

a photodetector for detecting part of the plurality of fluxes of light deflected by the optical deflector and outputting a synchronizing signal for controlling the timing of the scanning start of each of the fluxes of light;

a slit arranged between the optical deflector and the photodetector, the slit being inclined relative to the auxiliary scanning direction;

a developing unit for developing an electrostatic latent image formed by scanning the surface of the photosensitive body with the plurality of fluxes of light;

an image transfer unit for transferring the developed toner image onto paper;

a fixing unit for fixing the toner image transferred on the paper.

DESCRIPTION OF THE PREFERRED EMBODIMENTS

Now, the present invention will be described in greater detail by referring to the accompanying drawings that illustrate preferred embodiments of the invention.

Figure 1:
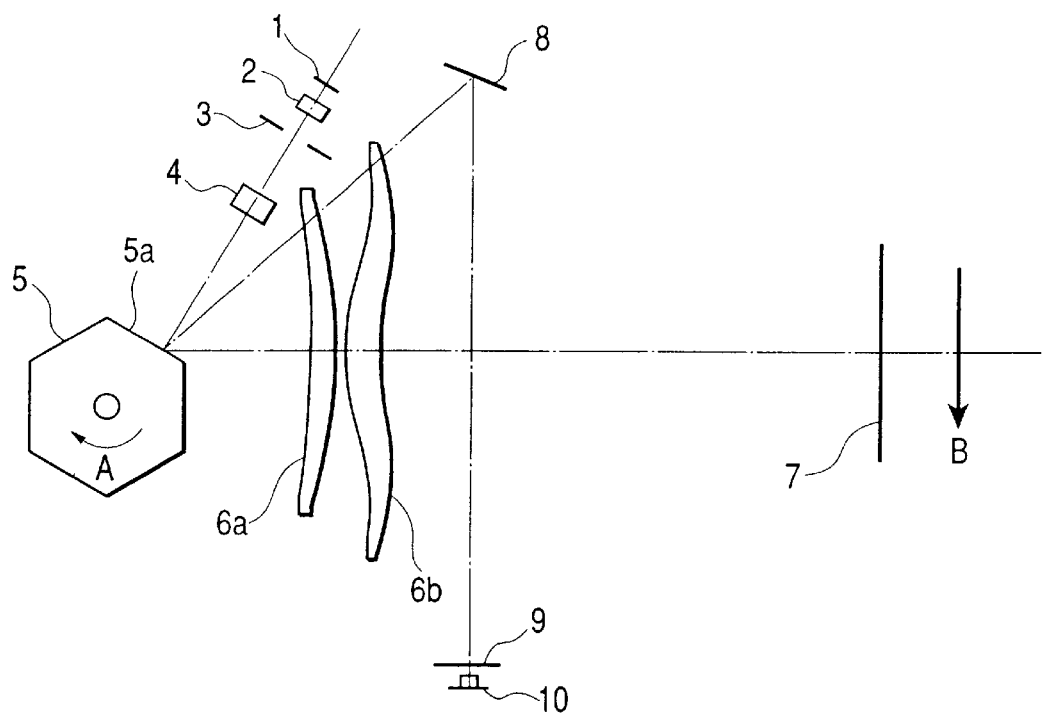
FIG. 1 is a schematic plan view of an embodiment of optical scanning apparatus according to the invention.

FIG. 1 is a schematic plan view of an embodiment of optical scanning apparatus according to the invention and comprising a light source unit 1 that may be a semiconductor laser array adapted to emit two fluxes of light, an optical system for incident light including a collimator lens 2, an aperture control 3 and a cylindrical lens 4 that are arranged along the path of the fluxes of light and a light deflector that may be a rotary polyhedral mirror 5. The rotary polyhedral mirror 5 is supported by a drive motor (not shown) and driven to rotate in the sense of arrow A at high speed.

A scanning optical system (focussing optical system) including fθ lenses 6a and 6b and a surface to be scanned 7 which may be that of a photosensitive drum are arranged on the path of most of the fluxes of light deflected by the deflecting plane 5a of the rotary polyhedral mirror 5. Additionally, a mirror 8 is arranged on the path of part of the fluxes of light passing through an end of the fθ lens system including the lenses 6a and 6b and a slit means 9 and a synchronizing signal sensor (photodetector) 10 are arranged on the path of the fluxes of light reflected by the mirror 8. The end of the fθ lens system including the lenses 6a and 6b and the slit means 9 form a synchronization detecting optical means whereas the synchronizing signal sensor 10 constitutes a synchronization detecting means. While the fluxes of light coming from the rotary polyhedral mirror 5 is partly focussed by an end of the fθ lens system including lenses 6a and 6b in the above description, an independent lens system may be used for focussing part of the fluxes of light coming from the rotary polyhedral mirror 5.

Figure 2:
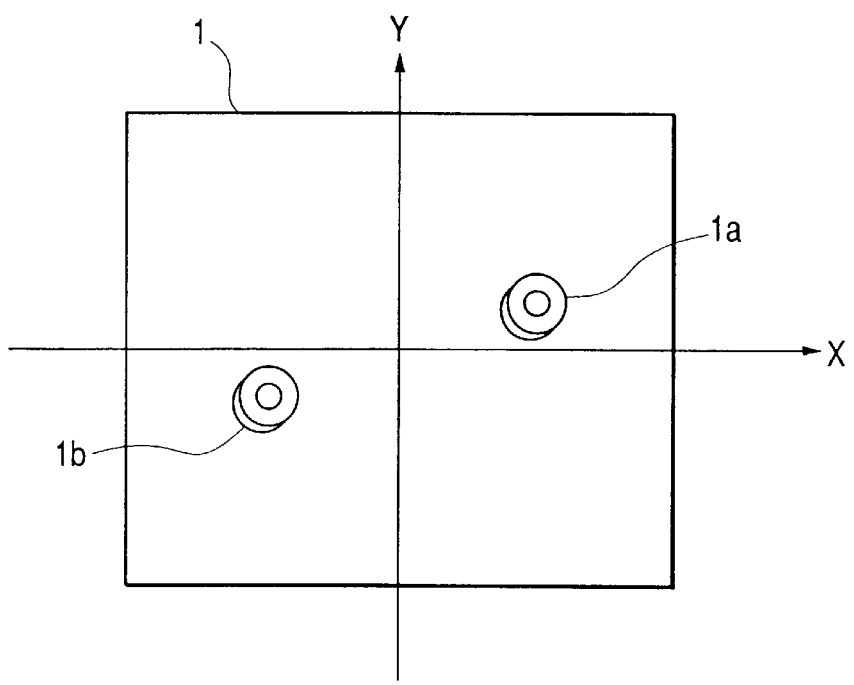
FIG. 2 is a schematic illustration of the light source unit of the embodiment of FIG. 1, showing the positional arrangement of the light sources.

As shown in FIG. 2 in enlarged dimensions, the light source unit 1 comprises a pair of light sources 1a and 1b that are separated from each other both in a principal scanning direction X and in an auxiliary scanning direction Y. The collimator lens 2 transforms the divergent fluxes of light from the light sources 1a, 1b into convergent fluxes of light and the aperture control 3 trims and optimizes the profiles of the convergent fluxes of light coming from the collimator lens 2. The cylindrical lens 4 shows a predetermined refracting effect only in the auxiliary scanning direction Y so that it focusses the convergent fluxes of light coming from the aperture control near the deflection plane 5a of the rotary polyhedral mirror 5 along the auxiliary scanning direction Y and produces a linear image along the principal scanning direction X.

The fθ lenses 6a and 6b are adapted to form respective spot images of the fluxes of light coming from the rotary polyhedral mirror 5 on the surface to be scanned 7 and also actually scan the surface to be scanned 7 with the respective spots of light at a constant rate in the direction indicated by arrow B. During this operation, the fθ lenses 6a and 6b establish a conjugated relationship between the vicinity of the deflection plane 5a of the rotary polyhedral mirror 5 and the vicinity of the surface to be scanned 7 in the auxiliary scanning direction Y to provide the function of correcting any relative inclination thereof, while the end portions of the fθ lenses 6a and 6b focus the fluxes of light reflected by the rotary polyhedral mirror 5 with a predetermined angle on the synchronizing signal sensor 10 and the slit means 9 determines the positions along the principal scanning direction X of the fluxes of light focussed on the surface to be scanned 7. The synchronizing signal sensor 10 outputs a synchronizing signal for controlling the timings of scanning starts of the respective fluxes of light.

Figure 3:
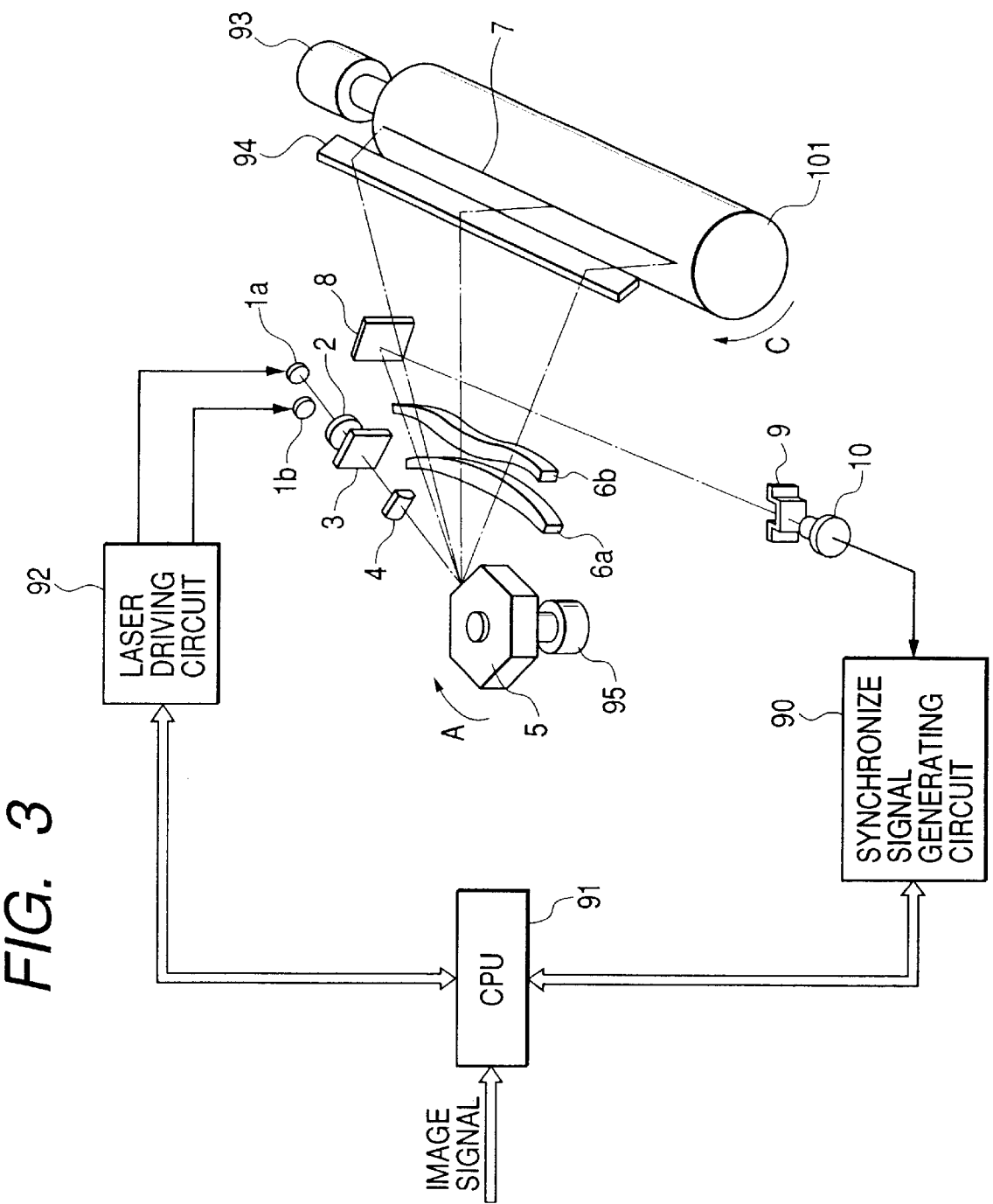
FIG. 3 is a schematic perspective view of the embodiment of FIG. 1.

FIG. 3 is a schematic perspective view of the embodiment of optical scanning apparatus of FIG. 1. The components same as those of FIG. 1 are denoted respectively by the same reference symbols. In this embodiment, the light sources 1a and 1b are semiconductor lasers that are connected to a laser drive circuit 92. Central processing unit (CPU) 91 drives the light sources 1a and 1b independently by way of the laser drive circuit 92 according to the input video signal.

The two fluxes of light that are emitted from the respective light sources 1a and 1b and modulated according to the input video signal are collimated by the collimator lens 2 and, after passing through the aperture control 3, they are made to strike the deflection plane of the rotary polyhedral mirror (optical deflector) 5 as long linear images running along the principal scanning direction formed by the lens 4. The rotary polyhedral mirror 5 is driven to rotate at high speed by a spindle motor 95 in the sense indicated by arrow A to deflect the two fluxes of light. These two fluxes of light are then made to pass through the fθ lenses 6a and 6b, reflected by a reflector mirror 94 and then focussed on the surface to be scanned 7 of the photosensitive drum 101 as so many spots of light. The spots of light are made to scan the surface to be scanned 7 along the principal scanning direction as the two fluxes of light are deflected. On the other hand, the photosensitive drum 101 is driven to rotate in the sense indicated by arrow C by means of a drive motor 93 and move relative to the spots of light along the auxiliary scanning direction. Thus an electrostatic latent image is formed on the photosensitive drum 101 as a result of the scanning motions of the spots of light along the principal scanning direction and the movement of the photosensitive drum 101 along the auxiliary scanning direction.

Meanwhile, part of the two fluxes of light deflected by the rotary polyhedral mirror 5 are reflected by the mirror 8, made to pass through the slit means 9 and received by the synchronizing signal sensor (photodetector) 10. The synchronizing signal sensor 10 is connected to a synchronizing signal generating circuit 90, which circuit 90 generates a synchronizing signal according to the output of the synchronizing signal sensor 10. The synchronizing signal generated by the synchronizing signal generating circuit 90 is then input to the central processing unit 91, which unit 91 then controls the timings of scanning starts of the spots of light on the surface to be scanned 7 and hence the timing of drawing an image.

Figure 4:
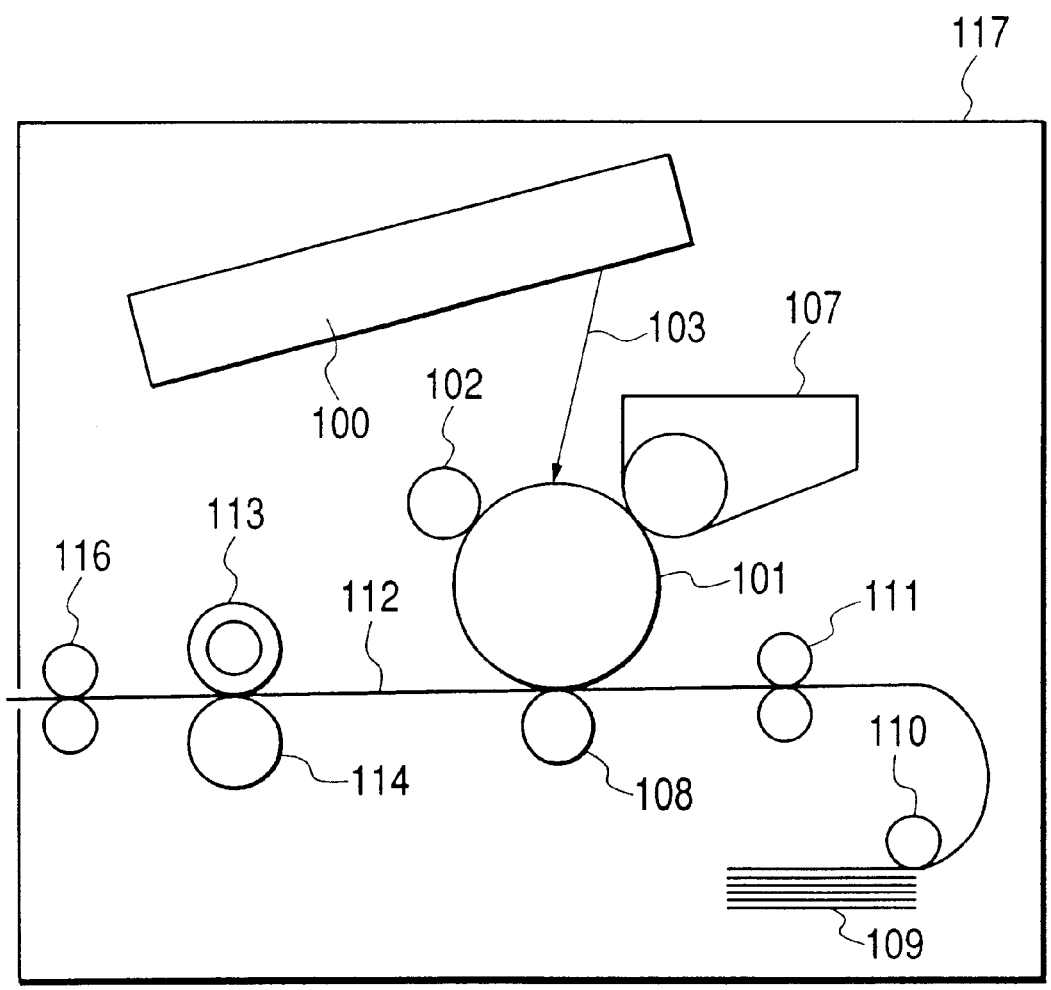
FIG. 4 is a schematic cross sectional view of an embodiment of electrophotographic printer according to the invention and comprising the embodiment of optical scanning apparatus of FIGS. 1 through 3.

FIG. 4 is a schematic cross sectional view in the auxiliary scanning direction of an embodiment of electrophotographic printer according to the invention and comprising the above described embodiment of optical scanning apparatus. In FIG. 4, there are shown an electrophotographic printer 117 and the embodiment of optical scanning apparatus 100 as described above by referring to FIGS. 1 through 3. In FIG. 4, reference numeral 101 denotes a photosensitive drum adapted to carry a electrostatic latent image and reference numeral 102 denotes a charging roller arranged above and held in contact with the photosensitive drum 101 in order to uniformly charge the surface of the photosensitive drum 101 with electricity. The surface of the photosensitive drum 101 is irradiated in an area downstream relative to the charging roller 102 with fluxes of light 103 coming from the optical scanning apparatus 100.

The fluxes of light 103 are modulated according to the input image data so that an electrostatic latent image is formed on the surface of the photosensitive drum 101 as the latter is irradiated with the fluxes of light 103. The electrostatic latent image is then developed into a toner image by means of developing unit 107 arranged to contact the photosensitive drum 101 at a position downstream relative to the spots where the surface of the photosensitive drum 101 is irradiated with the beams of light 103. Thereafter, the toner image is transferred onto paper 112 by means of transfer roller 108 arranged vis-a-vis under the photosensitive drum 101. While the paper 112 is stored in a paper cassette 109 located in front of the photosensitive drum 101 (and right to the drum 101 in FIG. 4), it may alternatively be fed with hand. A feed roller 110 is arranged at an end of the paper cassette 109 to feed the paper 112 in the paper cassette 109 to the paper feed path by way of register rollers 111.

Thus, the paper 112 onto which the unfixed toner image is transferred is then moved further to fixing unit arranged behind the photosensitive drum 101 (and left to the drum 101 in FIG. 4). The fixing unit contains in the inside a fixing roller 113 having a fixing heater (not shown) and a press roller 114 pressed against the fixing roller 113 so that, as the paper 112 fed from the transfer section of the printer is pressed and heated between the fixing roller 113 and the press roller 114, the unfixed toner image becomes fixed on the paper. The paper 112 now carrying the fixed image is then delivered to the outside of the printer by way of delivery rollers 116 provided behind the fixing roller 113.

Now, the slit means 9 that constitutes the most characteristic aspect of the present invention will be described in detail below.

Figure 5:
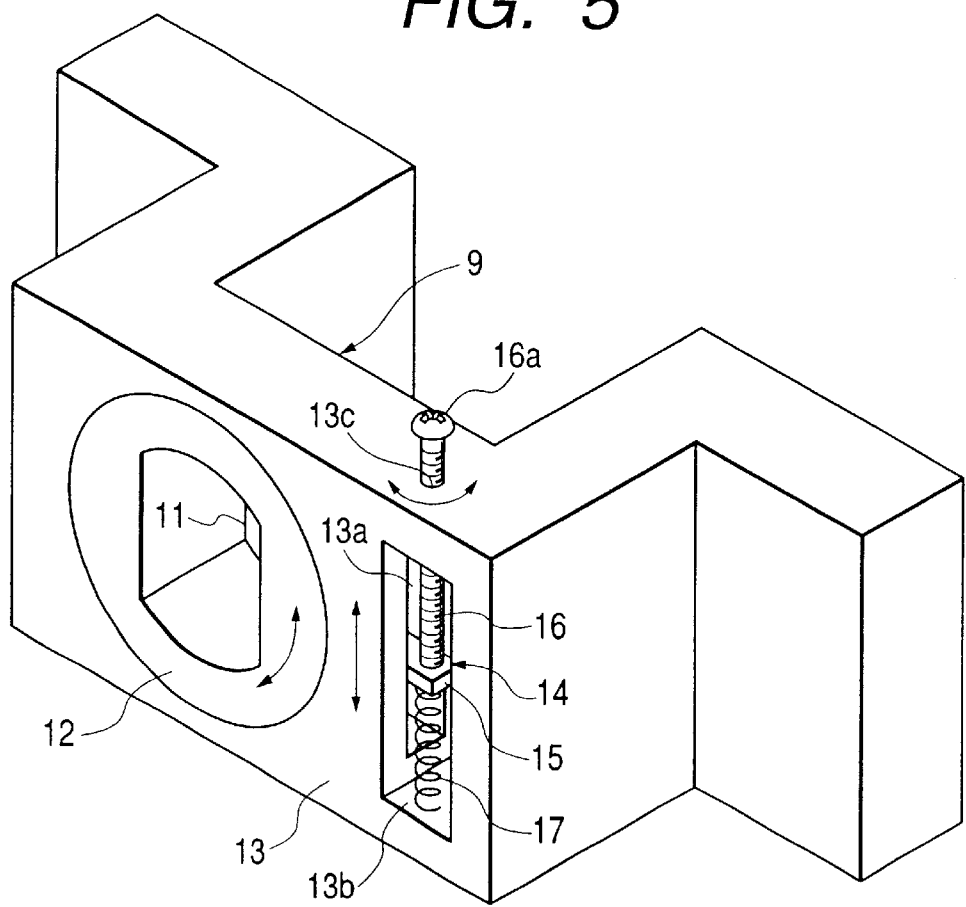
FIG. 5 is a schematic perspective view of a slit means that can be used for an optical scanning apparatus according to the invention.

Referring to FIG. 5 showing a perspective view of the slit means 9, it comprises a rotary plate 12 having a slit for allowing fluxes of light to pass therethrough, a holder 13 for rotatably holding the rotary plate 12 and a rotary mechanism 14 for driving the rotary plate 12 to rotate. The rotary mechanism includes a drive rod 15 linked to the rotary plate 12 by way of a horizontal hole 13a and exposed to the inside of a vertical hole 13b formed in the holder 13. An adjuster screw 16 having a knob section 16a for adjusting the rotary position of the drive rod 15 is extending through a screw hole 13c bored in the holder 13 to abut the drive rod 15, which drive rod 15 is urged toward the adjuster screw 16 by means of a coil spring 17.

Figure 6:
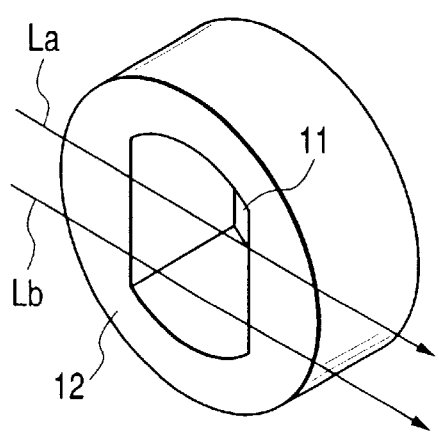
FIG. 6 is a schematic perspective view of the rotary plate of the slit means of FIG. 5, where the slit is not inclined.
Figure 7:
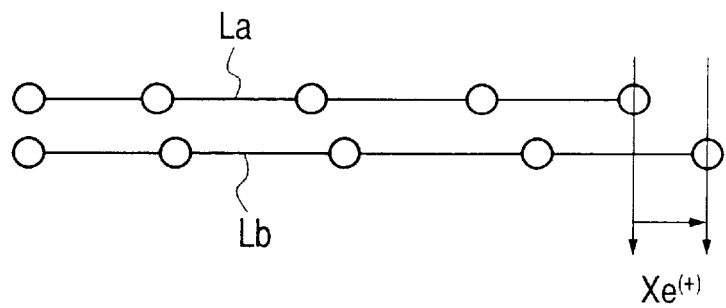
FIG. 7 is a schematic chart of scanning start timings when the slit is held to the state of FIG. 6.
Figure 8:
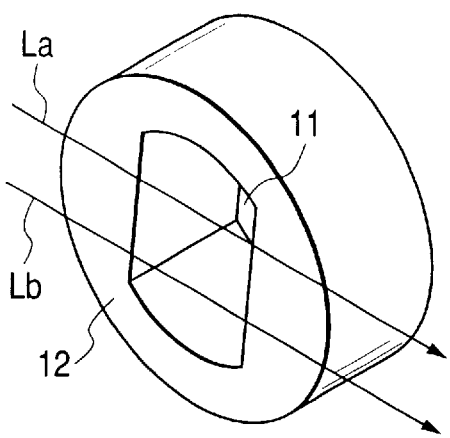
FIG. 8 is a schematic perspective view of the rotary plate of the slit means of FIG. 5 where the slit is slightly inclined.
Figure 9:
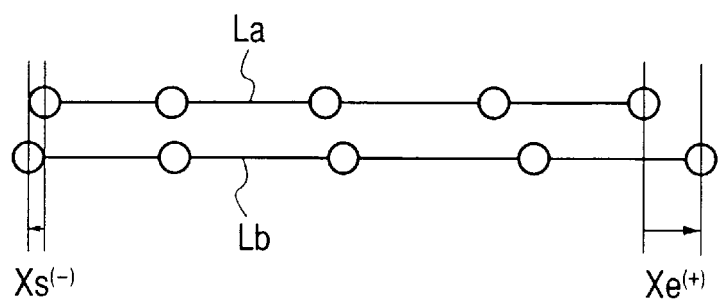
FIG. 9 is a schematic chart of scanning start timings when the slit is held to the state of FIG. 8.
Figure 10:
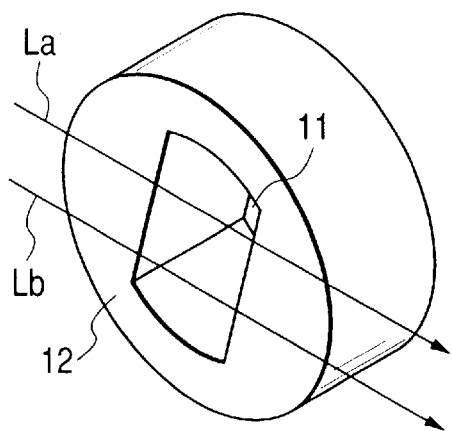
FIG. 10 is a schematic perspective view of the rotary plate of the slit means of FIG. 5 where the slit is further inclined.
Figure 11:
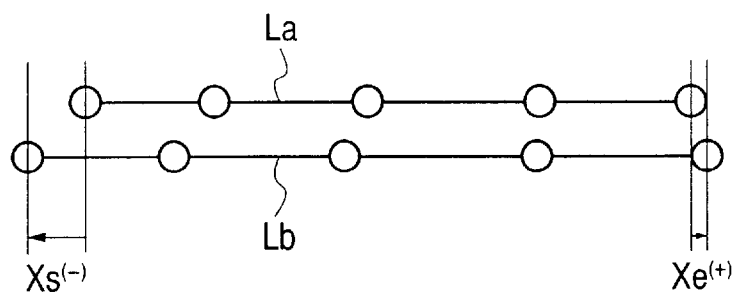
FIG. 11 is a schematic chart of scanning start timings when the slit is held to the state of FIG. 10.

FIG. 6 is a schematic perspective view of the rotary plate of the slit means of FIG. 5, where fluxes of light La and Lb emitted from respective light sources 1a and 1b are made to pass through the slit 11 that is not inclined, whereas FIG. 7 is a schematic chart of the scanning start points of the fluxes of light that are not displaced but the scanning end points are displaced from each other by an amount of displacement Xe. The sign of Xe in FIG. 7 is indicated as plus when the position of scanning end point for the flux of light Lb is displaced with reference to the position of scanning end point for the flux of light La. If the slit 11 is inclined under this condition as shown in FIG. 8, the scanning start points are negatively displaced by an amount of displacement Xs as shown in FIG. 9 to reduce the amount of displacement Xe of the scanning end points. The sign of Xs in FIG. 9 is indicated in the same manner as mentioned above for Xe. As the slit 11 is further inclined as shown in FIG. 10, the amount of displacement Xs of the scanning start points is increased to by turn reduce the amount of displacement Xe of the scanning end points as shown in FIG. 11.

Thus, it is possible to adjust the timings of detecting the fluxes of light La and Lb for the synchronizing signal sensor 10 and hence their scanning start points can be adjusted by appropriately inclining the slit 11 of the slit means 9 in the auxiliary scanning direction Y. This will be described further below.

Figure 12:
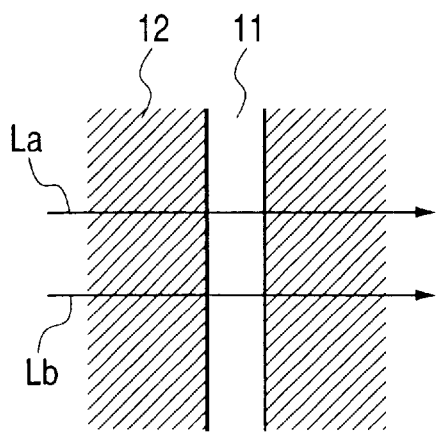
FIG. 12 is a schematic illustration of a slit that can be used for the purpose of the invention, where the slit is not inclined.
Figure 13:
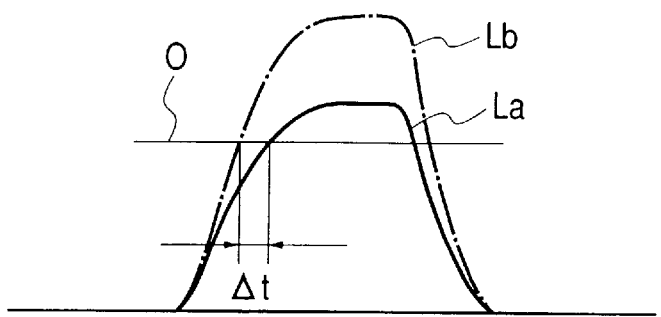
FIG. 13 is a chart illustrating the waveforms of the outputs of the synchronizing signal sensor of the embodiment of optical scanning apparatus using the slit of FIG. 12 when the slit is held to the state of FIG. 12.

FIG. 12 is a schematic illustration of a slit that can be used for the purpose of the invention, where the slit is not inclined, and FIG. 13 is a chart illustrating the waveforms of the outputs of the synchronizing signal sensor when the slit is held to the state of FIG. 12 and the rising edges of the fluxes of light La and Lb are made to agree with each other but the quantities of light of the fluxes of light La and Lb are differentiated. Note that, in FIG. 13, the solid curved line indicates the flux of light La, whereas the broken curved line indicates the flux of Lb. The reference line drawn at the height of the offset value of 0 is used to determine if the fluxes of light La and Lb have passed through the synchronizing signal sensor 10. Thus, FIG. 13 illustrates that there is a time lag Δt between the flux of light La and the flux of light Lb that have gone over the offset value 0 and the scanning start of the flux of light La is behind that of the flux of light Lb by time Δt.

Figure 14:
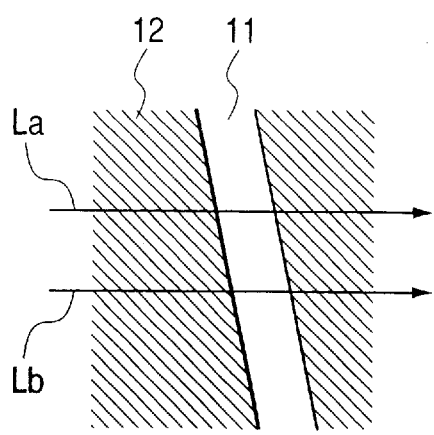
FIG. 14 is a schematic illustration of the slit of FIG. 12, where the slit is inclined.
Figure 15:
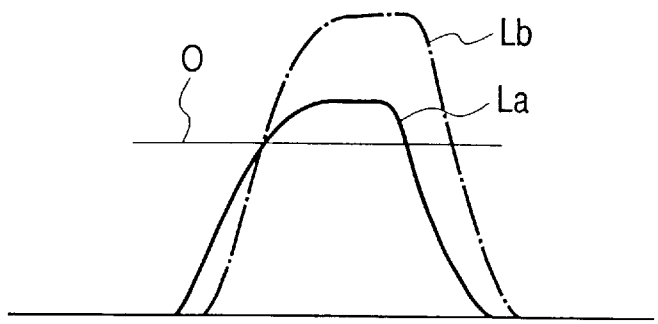
FIG. 15 is a chart illustrating the waveforms of the outputs of the synchronizing signal sensor of the embodiment of optical scanning apparatus using the slit of FIG. 12 when the slit is held to the state of FIG. 14.

On the other hand, FIG. 14 is a schematic illustration of the slit same as that of FIG. 12, where the slit is inclined, and FIG. 15 is a chart illustrating the waveforms of the outputs of the synchronizing signal sensor when the slit is held to the state of FIG. 14. Then, both the flux of light La and the flux of light Lb cross the offset value line 0 at the same time and the synchronizing signal sensor 10 issues a signal that makes the scanning start point of the flux of light La and that of the flux of light Lb agree with each other.

Figure 16:
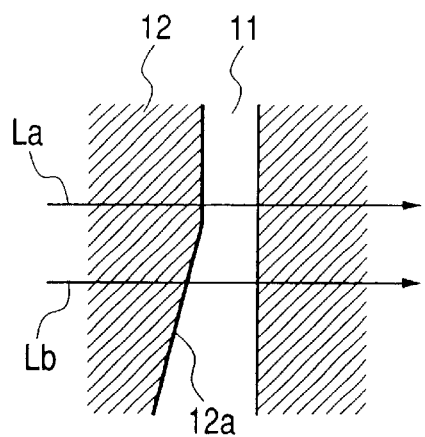
FIG. 16 is a schematic illustration of another slit that can be used for the purpose of the invention and has a notch, where the slit is not inclined.
Figure 17:
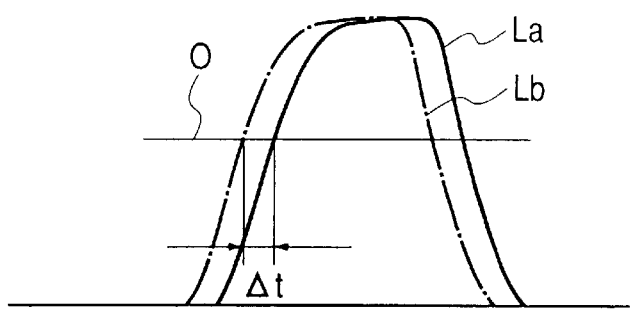
FIG. 17 is a chart illustrating the waveforms of the outputs of the synchronizing signal sensor of the embodiment of optical scanning apparatus using the slit of FIG. 16 when the slit is held to the state of FIG. 16.
Figure 18:
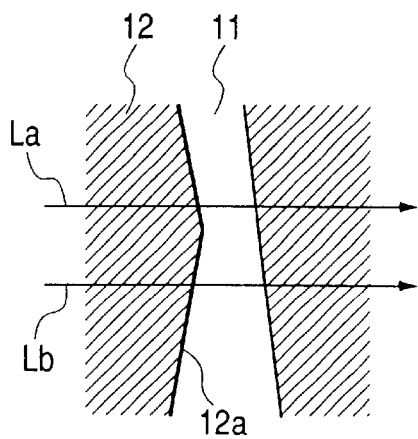
FIG. 18 is a schematic illustration of the slit of FIG. 16, where the slit is inclined.
Figure 19:
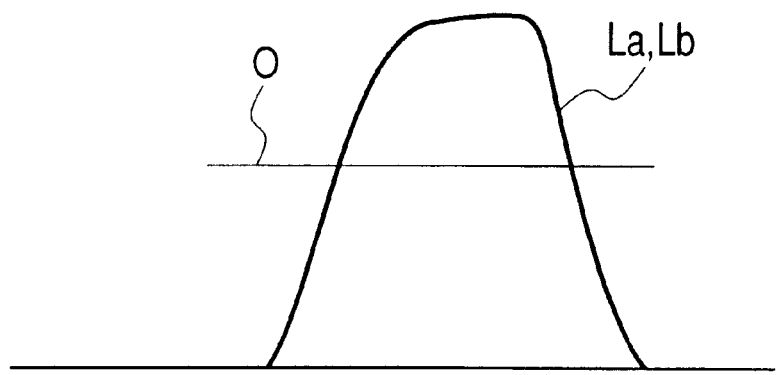
FIG. 19 is a chart illustrating the waveform of the outputs of the synchronizing signal sensor of the embodiment of optical scanning apparatus using the slit of FIG. 16 when the slit is held to the state of FIG. 18.

If the rotary plate 12 of the slit 11 has a notched section 12a as shown in FIG. 16, there is also a time lag Δt between the flux of light La and the flux of light Lb that have gone over the offset value 0 and the scanning start of the flux of light La is behind that of the flux of light Lb by time Δt as shown in FIG. 17. However, if the slit 11 is inclined as shown in FIG. 18, the two fluxes of light La and Lb no longer show any time lag Δt and the synchronizing signal sensor issues a signal that makes the scanning start point of the flux of light La and that of the flux of light Lb agree with each other as shown in FIG. 19.

Furthermore, if the time lag between the time when the synchronizing signal sensor 10 detects the flux of light La and the time when the sensor 10 detects the flux of light Lb and the time lag between the time when the flux of light La crosses the level of the image height for the scanning start point and the time when the flux of light Lb crosses the level of the image height for the scanning start point are attributable to the difference in the magnifying power or some other causes, the synchronizing signal sensor 10 is made to issue a signal for making the scanning start points of the two fluxes of light agree with each other by inclining the slit 11. The same effect is obtained also when the fluxes of light La and Lb from the collimator lens are parallel or divergent fluxes.

On the other hand, since the fluxes of light La and Lb entering the rotary polyhedral mirror 5 are converging fluxes, the image point of the flux of light La and that of the flux of light Lb are displaced from each other along the principal scanning direction even if the scanning start points of the two fluxes agree with each other in the principal scanning direction X. In other words, the positional relationship between the points of spontaneous convergence of the fluxes of light La and Lb established by the optical means for incident light is modified as the rotary polyhedral mirror 5 rotates to move the reflection point along the optical axis of the optical means for incident light.

For instance, if the angle of deflection of the deflection plane 5a of the rotary polyhedral mirror 5 is equivalent for both of the fluxes of light La and Lb, the fluxes of light La and Lb scan different image heights. Then, if the angle of deflection of the flux of light La is differentiated from that of the flux of light Lb by providing a time lag between the time when the flux of light La starts scanning and the time when the flux of light Lb starts scanning so that the points of scanning start of the fluxes agree with each other, the deflection plane 5a is positionally shifted forwardly or rearwardly when the angle of deflection is modified because the center of rotation of the deflection plane 5a is not found on the deflection plane 5a itself. Additionally, the positional shift of the deflection plane 5a is not proportional to the angle of deflection but approximates a parabola that can be expressed by a quadratic function.

Figure 20:
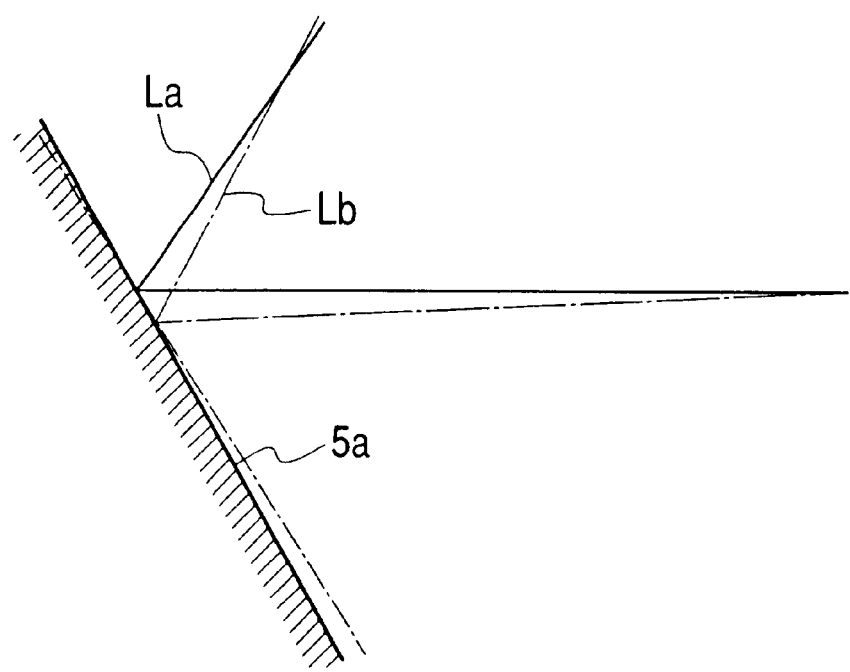
FIGS. 20, 21 and 22 are schematic illustrations of possible positional relationships of a deflection plane and two fluxes of light that can appear in an optical scanning apparatus according to the invention.
Figure 21:
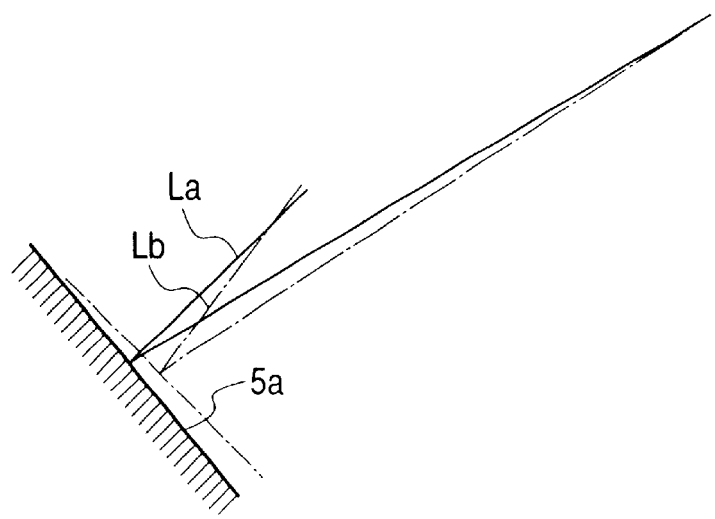
Figure 22:
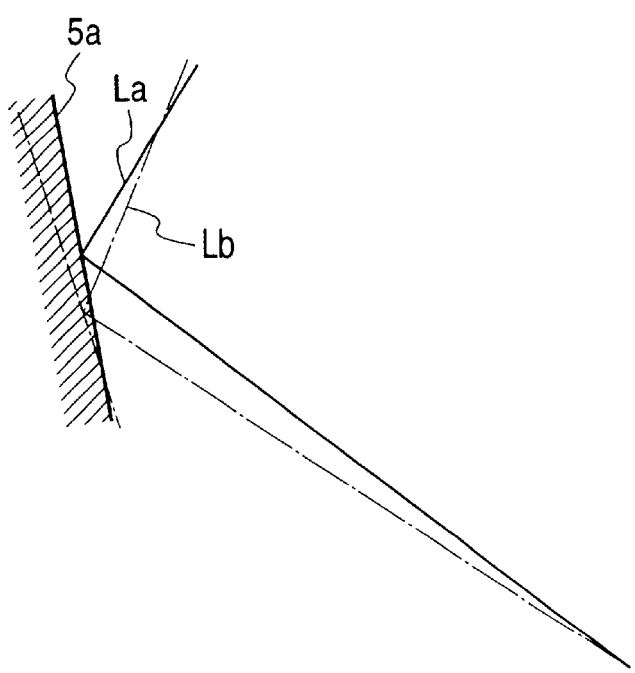

Therefore, if the fluxes of light La and Lb are located substantially at a same spot on the deflection plane 5a when the image height is equal to zero as shown in FIG. 20 and the fluxes of light La and Lb are deflected from the optical axis of the optical means for incident light by the deflection plane 5a, the deflection plane for the flux of light Lb is located closer to the light source 1b at the side of scanning start position as shown in FIG. 21, whereas the deflection plane for the flux of light La is located closer to the light source 1a at the side of scanning end position as shown in FIG. 22.

Figure 23:
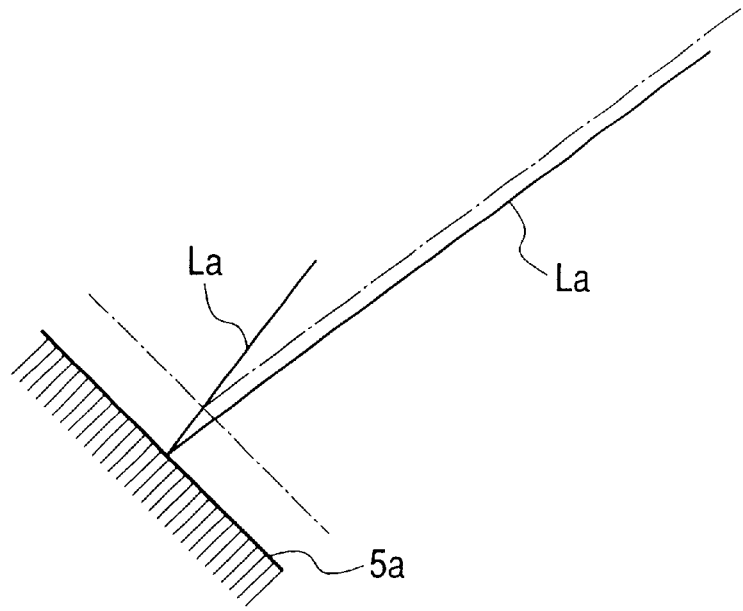
FIGS. 23 and 24 are schematic illustrations showing how a point of spontaneous convergence is shifted.
Figure 24:
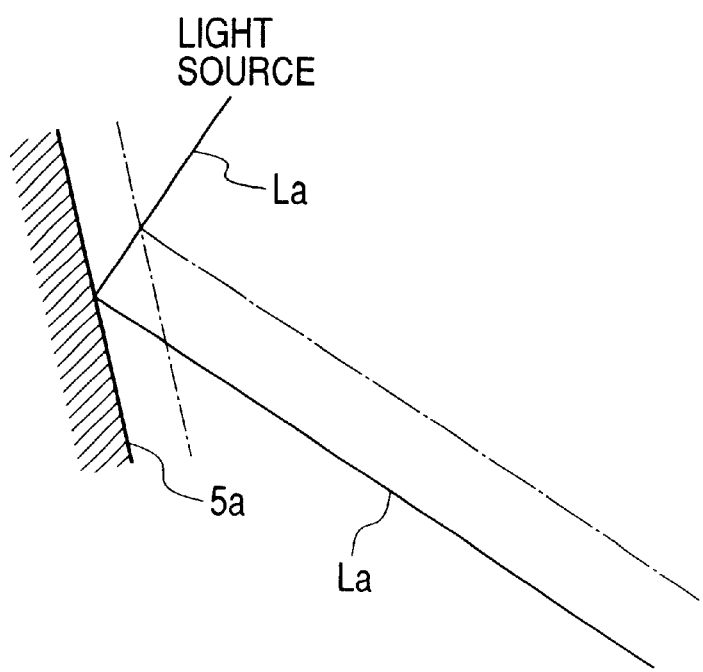

Additionally, when one of the fluxes of light, e.g., flux of light La, is made to strike the deflection plane 5a and the latter is displaced from the position indicated by a solid line to the position indicated by a broken line in FIG. 23, the point of spontaneous convergence of the flux of light La is displaced too to the position also indicated by a broken line in FIG. 23. Similarly, deflection plane 5a is rotated from the position indicated by a solid line to the position indicated by a broken line in FIG. 24, the point of spontaneous convergence of the flux of light La is also displaced too to the position also indicated by a broken line in FIG. 24. Thus, the point of spontaneous convergence is moved depending on the angle of deflection along the principal scanning direction X by an amount that varies as a function of the image height. As a result, since the scanning start points of the two fluxes of light La and Lb are influenced by the displacement of the point of spontaneous convergence, their positional relationships relative to the principal scanning direction X are modified as a function of the movement of the deflection plane 5a.

Figure 25:
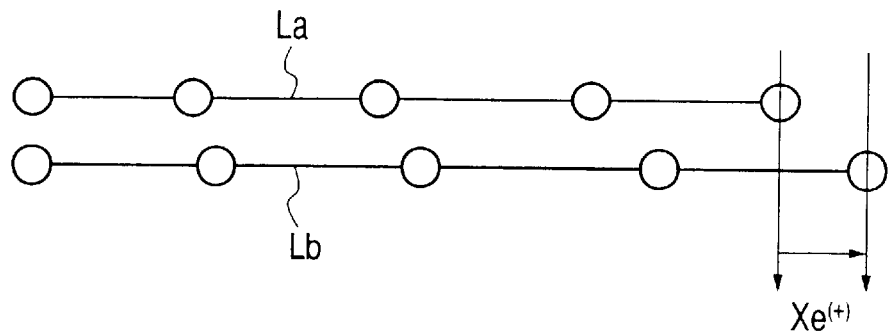
FIG. 25 is a schematic chart illustrating the timings of the scanning starts of fluxes of light that are differentiated from each other.
Figure 26:
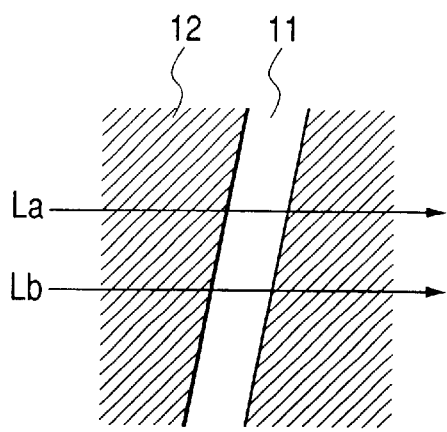
FIG. 26 is a schematic illustration of a slit that can be used for the purpose of the invention, where the slit is inclined.
Figure 27:
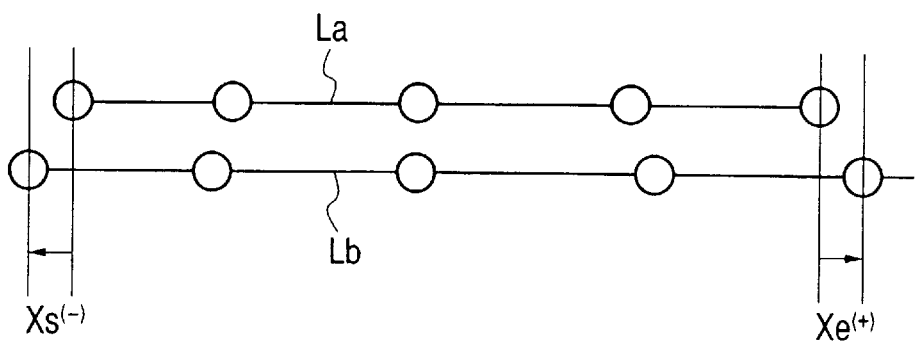
FIG. 27 is a schematic chart illustrating the timings of the scanning starts of fluxes of light that can be regulated by means of the slit of an optical scanning apparatus according to the invention.

Therefore, even if the scanning start points of the two fluxes of light La and Lb are made to agree with each other in terms of the image height at which the scanning operation is started by arranging the slit 11 to an unrotated state under ideal conditions where no difference arises in the ratio of the quantities of light, the point of spontaneous convergence may be shifted subsequently in a different way for the fluxes of light La and Lb. Thus, even if the slit 11 is not inclined as shown in FIG. 12, the positional relationship of the image points of the two fluxes of light on the surface to be scanned 7 may be shifted along the principal scanning direction X as shown in FIG. 25. If, on the other hand, the slit 11 is inclined in the auxiliary scanning direction Y as shown in FIG. 26, the shift can be minimized as shown in FIG. 27.

Thus, in this embodiment, if the negative displacement of the scanning start points of the two fluxes of light La and Lb in the principal scanning direction X is expressed by $\Delta Xs$ and the positive displacement of the scanning end points of the two fluxes of light La and Lb in the principal scanning direction X is expressed by $\Delta Xe$, it is desirable that the positional relationship of the image points of the two fluxes of light satisfies the requirement of formula (1) below;

$$\Delta Xs \cdot \Delta Xe < 0 \qquad (1)$$

and also the requirement of formula (2) below;

$$-2 < \Delta Xe / \Delta Xs < -0.5 \qquad (2).$$

Thus, both the scanning optical system of the above embodiment and an image forming apparatus using such an optical system can provide high quality images with a reduced level of jitter when the requirements of the above equations (1) and (2) are met. Additionally, the load for signal processing operations can be reduced to allow the use of a simply configured system for processing signals in order to produce images at high speed by making the lapse of time between the time when the synchronizing signal sensor 10 outputs a synchronizing signal and the time when a corresponding scanning operation is started is made equal for both of the fluxes of light La and Lb.

Figure 28:
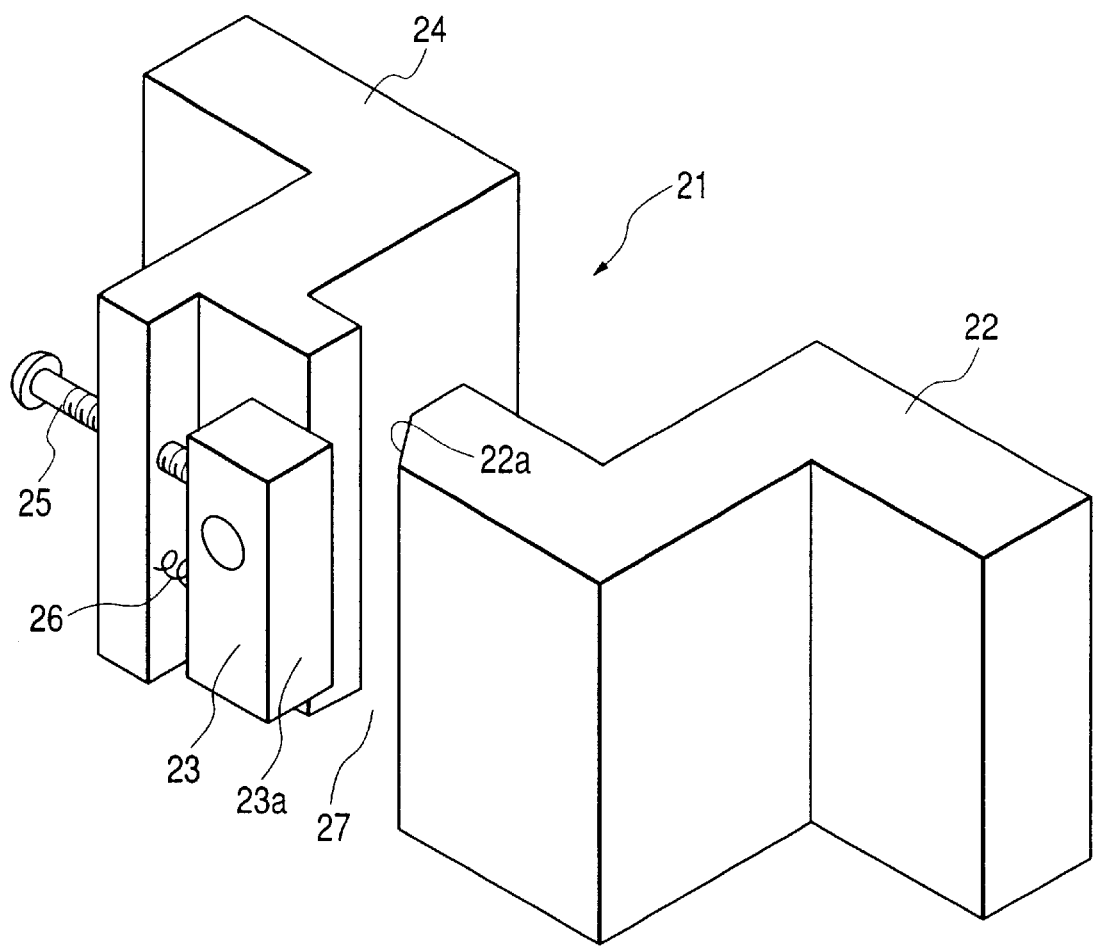
FIG. 28 is a schematic perspective view of a slit means obtained by modifying that of FIG. 5.

If it is not possible to use a rotary slit means 9 for some reasons such as manufacture-related problems and/or the requirements to be met for the arrangement of components, a slit means 21 having one of the lateral sides of the slit made tiltable as shown in FIG. 28 may alternatively be used. The slit means of FIG. 28 comprises a fixed slit member 22 providing a lateral side 22a of the slit, a rotary member 23 providing another lateral side 23a of the slit, a holder 24 for rotatably holding the rotary member 23, an adjuster screw 25 for adjusting the rotary position of the rotary member 23 and a coil spring 26 for urging the rotary member counterclockwise, the slit 27 being defined by the two lateral sides 22a and 23a.

Figure 29:
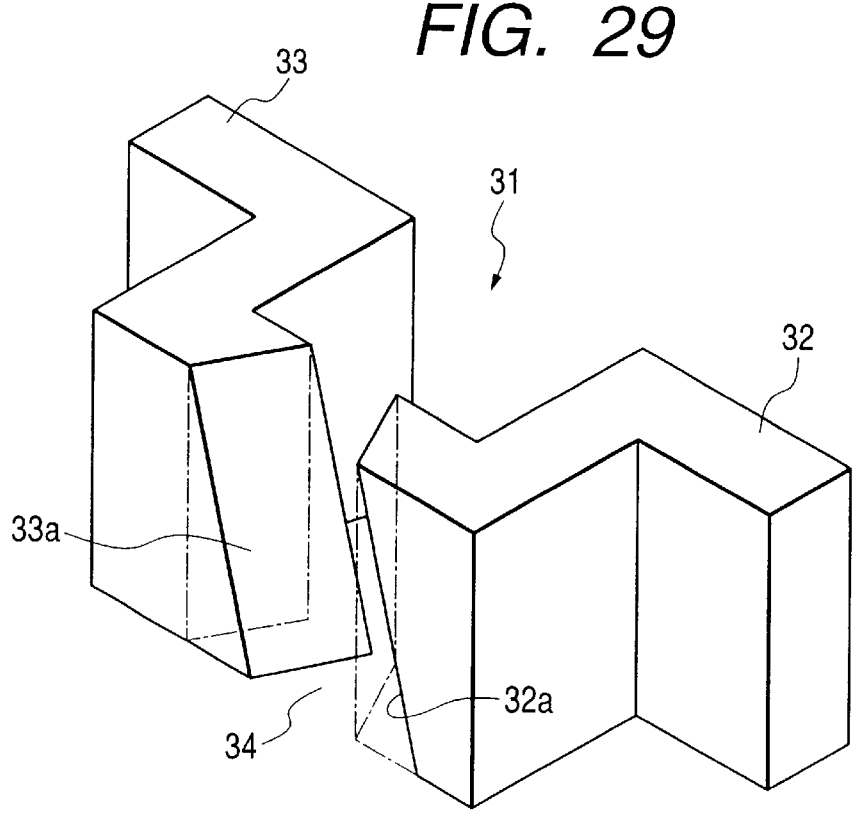
FIG. 29 is a schematic perspective view of another slit means obtained by modifying that of FIG. 5.

If it is possible to know the angle of inclination of the slit 11 in advance, the slit means 9 may be replaced by a slit means 31 as shown in FIG. 29. The slit means 31 comprises members 32 and 33 having respective inclined lateral sides 32a, 33a that define the inclined slit 34.

Figure 30:
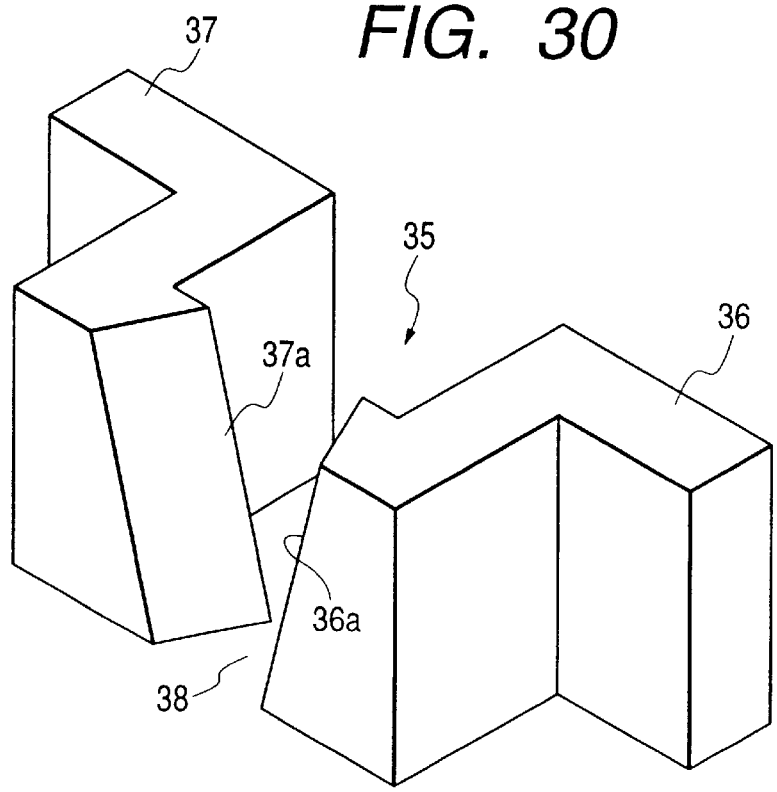
FIG. 30 is a schematic perspective view of still another slit means obtained by modifying that of FIG. 5.

Still alternatively, a slit means 35 as shown in FIG. 30 may be used depending on the manufacturing conditions. The illustrated slit means 35 comprises members 36 and 37 having respective inclined lateral sides 36a, 37a that define a V-shaped slit 38. With this arrangement, if the flux of light La or Lb that passes through a lower portion of the slit 38 has to be used for staring a scanning operation, a falling edge of the output signal of the synchronizing signal sensor 10 may be used for determining the timing of the start of the scanning operation, although it may be appreciated that the above description holds true for the slit means 21 shown in FIG. 28 and having an adjusting means.

The applicability of the present invention is by no means limited to the above embodiments, which may be modified in many various different ways without departing from the scope of the invention as defined by the claims that follow.

What is claimed is:

1. An optical scanning apparatus for scanning a surface to be scanned with a plurality of fluxes of light along a principal scanning direction, said apparatus comprising:

a plurality of light sources arranged at intervals along an auxiliary scanning direction perpendicularly to said principal scanning direction;

an optical deflector for deflecting the plurality of fluxes of light emitted from said plurality of light sources;

an optical system for incident light adapted to lead said plurality of fluxes of light emitted from said plurality of light sources to said optical deflector;

an imaging optical system for forming images of said plurality of fluxes of light deflected by said optical deflector on the surface to be scanned;

a photodetector for detecting part of said plurality of fluxes of light deflected by said optical deflector and outputting a synchronizing signal for controlling the timing of the scanning start of each of the fluxes of light; and a slit arranged between said optical deflector and said photodetector;

said slit being inclined relative to said auxiliary scanning direction.

2. An optical scanning apparatus according to claim 1, further comprising:

a holder having a mechanism for adjusting the angle of said slit relative to said auxiliary scanning direction.

3. An optical scanning apparatus according to claim 2, wherein said slit is arranged in a rotary plate rotatably held by said holder.

4. An optical scanning apparatus according to claim 3, wherein a drive rod is linked to said rotary plate and said holder is provided with a spring for urging said drive rod in a predetermined direction and an adjuster screw kept in contact with said drive rod to hold said drive rod to a predetermined position against the resilient force of said spring.

5. An optical scanning apparatus according to claim 2, wherein said slit is defined by a fixed lateral side of said holder and a movable lateral side of a rotary member rotatably held by said holder;

said holder being provided with a spring for urging said rotary member in a predetermined direction and an adjuster screw kept in contact with said drive rod to hold said drive rod to a predetermined position against the resilient force of said spring.

6. An optical scanning apparatus according to claim 1, wherein said plurality of light sources are arranged at intervals along the principal scanning direction and said optical system for incident light is adapted to make the plurality of fluxes of light emitted from the light sources strike the optical deflector as convergent fluxes of light or divergent fluxes of light.

7. An optical scanning apparatus according to claim 1, wherein the requirement expressed by formula $$\Delta Xs \cdot \Delta Xe < 0$$

is satisfied, where $\Delta Xs$ is the amount of positional displacement of the scanning start point of the flux of light emitted from one of said plurality of light sources in the principal scanning direction with reference to the scanning start point of the flux of light emitted from another one of said plurality of light sources in the principal scanning direction and $\Delta Xe$ is the amount of positional displacement of the scanning end point of the flux of light emitted from said first one of said plurality of light sources in the principal scanning direction with reference to the scanning end point of the flux of light emitted from said second one of said plurality of light sources in the principal scanning direction on the surface to be scanned, and where $\Delta Xs$ and $\Delta Xe$ take positive values when the displacement direction is the same as the principal scanning direction.

8. An optical scanning apparatus according to claim 1, wherein the elapse of time between the time when said photodetector detects part of the flux of light emitted from said first one of said plurality of light sources and outputs a synchronizing signal and the time when the flux of light emitted from said first one of said plurality of light sources starts scanning is equal to the elapse of time between the time when said photodetector detects part of the flux of light emitted from said second one of said plurality of light sources and outputs a synchronizing signal and the time when the flux of light emitted from said second one of said plurality of light sources starts scanning.

9. An optical scanning apparatus according to claim 7, the requirement expressed by formula $$-2 < \Delta Xe / \Delta Xs < -0.5$$

is also satisfied.

10. An optical scanning apparatus according to claim 1, wherein said plurality of light sources are semiconductor lasers;

said optical scanning apparatus further comprising laser drive circuits for driving said semiconductor lasers, a synchronizing signal generating circuit for generating a synchronizing signal on the basis of the output of said photodetector and a central processing unit for receiving the synchronizing signal output from said synchronizing signal generating circuit and controlling the light emission timings of said semiconductor lasers independently by means of said laser drive circuits.

11. An optical scanning apparatus according to claim 1, wherein said optical deflector is a polygon mirror.

12. An optical scanning apparatus according to claim 1, wherein said optical system for incident light comprises a collimator lens, an aperture control and a cylindrical lens.

13. An optical scanning apparatus according to claim 1, wherein said imaging optical system comprises fθ lenses.

14. An image forming apparatus for forming an image by scanning the surface to be imaged with a plurality of fluxes of light along a principal scanning direction, said apparatus comprising:

a plurality of light sources arranged at intervals a long an auxiliary scanning direction perpendicular to said principal scanning direction;

a central processing unit for driving said plurality of light sources independently relative to each other according to an image signal;

an optical deflector for deflecting the plurality of fluxes of light emitted from said plurality of light sources;

an optical system for incident light adapted to lead said plurality of fluxes of light emitted from said plurality of light sources to said optical deflector;

an imaging optical system for forming images of said plurality of fluxes of light deflected by said optical deflector on the surface to be imaged;

a photodetector for detecting part of said plurality of fluxes of light deflected by said optical deflector and outputting a synchronizing signal for controlling the timing of the scanning start of each of the fluxes of light; and a slit arranged between said optical deflector and said photodetector;

said slit being inclined relative to said auxiliary scanning direction.

15. An image forming apparatus according to claim 14, further comprising:

a holder having a mechanism for adjusting the angle of said slit relative to said auxiliary scanning direction.

16. An image forming apparatus according to claim 15, wherein said slit is arranged in a rotary plate rotatably held by said holder.

17. An image forming apparatus according to claim 16, wherein a drive rod is linked to said rotary plate and said holder is provided with a spring for urging said drive rod in a predetermined direction and an adjuster screw kept in contact with said drive rod to hold said drive rod to a predetermined position against the resilient force of said spring.

18. An image forming apparatus according to claim 15, wherein said slit is defined by a fixed lateral side of said holder and a movable lateral side of a rotary member rotatably held by said holder;

said holder being provided with a spring for urging said rotary member in a predetermined direction and an adjuster screw kept in contact with said drive rod to hold said drive rod to a predetermined position against the resilient force of said spring.

19. An image forming apparatus according to claim 14, wherein said plurality of light sources are arranged at intervals along the principal scanning direction and said optical system for incident light is adapted to make the plurality of fluxes of light emitted from the light sources strike the optical deflector as convergent fluxes of light or divergent fluxes of light.

20. An image forming apparatus according to claim 14, wherein the requirement expressed by formula $$\Delta Xs \cdot \Delta Xe < 0$$

is satisfied, where $\Delta Xs$ is the amount of positional displacement of the image drawing start point of the flux of light emitted from one of said plurality of light sources in the principal scanning direction with reference to the image drawing start point of the flux of light emitted from another one of said plurality of light sources in the principal scanning direction and $\Delta Xe$ is the amount of positional displacement of the image drawing end point of the flux of light emitted from said first one of said plurality of light sources in the principal scanning direction with reference to the image drawing end point of the flux of light emitted from said second one of said plurality of light sources in the principal scanning direction on the image forming surface, and where $\Delta Xs$ and $\Delta Xe$ take positive values when the displacement direction is the same as the principal scanning direction.

21. An image forming apparatus according to claim 14, wherein the elapse of time between the time when said photodetector detects part of the flux of light emitted from said first one of said plurality of light sources and outputs a synchronizing signal and the time when the flux of light emitted from said first one of said plurality of light sources starts drawing an image is equal to the elapse of time between the time when said photodetector detects part of the flux of light emitted from said second one of said plurality of light sources and outputs a synchronizing signal and the time when the flux of light emitted from said second one of said plurality of light sources starts drawing an image.

22. An image forming apparatus according to claim 20, the requirement expressed by formula $$-2 < \Delta Xe / \Delta Xs < -0.5$$

is also satisfied.

23. An image forming apparatus according to claim 14, wherein said plurality of light sources are semiconductor lasers;

said image forming apparatus further comprising laser drive circuits for driving said semiconductor lasers, a synchronizing signal generating circuit for generating a synchronizing signal on the basis of the output of said photodetector and a central processing unit for receiving the synchronizing signal output from said synchronizing signal generating circuit and controlling the light emission timings of said semiconductor lasers independently by means of said laser drive circuits.

24. An image forming apparatus according to claim 14, wherein said optical deflector is a polygon mirror.

25. An image forming apparatus according to claim 14, wherein said optical system for incident light comprises, collimator lens, an aperture control and a cylindrical lens.

26. An image forming apparatus according to claim 14, wherein said imaging optical system comprises fθ lenses.

27. An electrophotographic printer for forming an image by scanning the surface of a photosensitive body with a plurality of fluxes of light along a principal scanning direction, said apparatus comprising:

a plurality of light sources arranged at intervals along an auxiliary scanning direction perpendicular to said principal scanning direction;

a central processing unit for driving said plurality of light sources independently relative to each other according to an image signal;

an optical deflector for deflecting the plurality of fluxes of light emitted from said plurality of light sources;

an optical system for incident light adapted to lead said plurality of fluxes of light emitted from said plurality of light sources to said optical deflector;

a photodetector for detecting part of said plurality of fluxes of light deflected by said optical deflector and outputting a synchronizing signal for controlling the timing of the scanning start of each of the fluxes of light;

a slit arranged between said optical deflector and said photodetector, said slit being inclined relative to said auxiliary scanning direction;

a developing unit for developing an electrostatic latent image formed by scanning the surface of said photosensitive body with said plurality of fluxes of light as toner image;

an image transfer unit for transferring the developed toner image onto paper;

a fixing unit for fixing the toner image transferred on the paper.

28. An electrophotographic printer according to claim 27, further comprising:

a holder having a mechanism for adjusting the angle of said slit relative to said auxiliary scanning direction.

29. An electrophotographic printer according to claim 28, wherein said slit is arranged in a rotary plate rotatably held by said holder.

30. An electrophotographic printer according to claim 29, wherein a drive rod is linked to said rotary plate and said holder is provided with a spring for urging said drive rod in a predetermined direction and an adjuster screw kept in contact with said drive rod to hold said drive rod to a predetermined position against the resilient force of said spring.

31. An electrophotographic printer according to claim 28, wherein said slit is defined by a fixed lateral side of said holder and a movable lateral side of a rotary member rotatably held by said holder;

said holder being provided with a spring for urging said rotary member in a predetermined direction and an adjuster screw kept in contact with said drive rod to hold said drive rod to a predetermined position against the resilient force of said spring.

32. An electrophotographic printer according to claim 27, wherein said plurality of light sources are arranged at intervals along the principal scanning direction and said optical system for incident light is adapted to make the plurality of fluxes of light emitted from the light sources strike the optical deflector as convergent fluxes of light or divergent fluxes of light.

33. An electrophotographic printer according to claim 27, wherein the requirement expressed by formula $$\Delta Xs \cdot \Delta Xe < 0$$

is satisfied, where $\Delta Xs$ is the amount of positional displacement of the electrostatic latent image drawing start point of the flux of light emitted from one of said plurality of light sources in the principal scanning direction with reference to the electrostatic latent image drawing start point of the flux of light emitted from another one of said plurality of light sources in the principal scanning direction and $\Delta Xe$ is the amount of positional displacement of the electrostatic latent image drawing end point of the flux of light emitted from said first one of said plurality of light sources in the principal scanning direction with reference to the electrostatic latent image drawing end point of the flux of light emitted from said second one of said plurality of light sources in the principal scanning direction on the photosensitive body, and where $\Delta Xs$ and $\Delta Xe$ take positive values when the displacement direction is the same as the principal scanning direction.

34. An electrophotographic printer according to claim 27, wherein the elapse of time between the time when said photodetector detects part of the flux of light emitted from said first one of said plurality of light sources and outputs a synchronizing signal and the time when the flux of light emitted from said first one of said plurality of light sources starts drawing an electrostatic latent image is equal to the elapse of time between the time when said photodetector detects part of the flux of light emitted from said second one of said plurality of light sources and outputs a synchronizing signal and the time when the flux of light emitted from said second one of said plurality of light sources starts drawing an electrostatic latent image.

35. An electrophotographic printer according to claim 33, the requirement expressed by formula $$-2 < \Delta Xe / \Delta Xs < -0.5$$

is also satisfied.

36. An electrophotographic printer according to claim 27, wherein said plurality of light sources are semiconductor lasers;

said electrophotographic printer further comprising laser drive circuits for driving said semiconductor lasers, a synchronizing signal generating circuit for generating a synchronizing signal on the basis of the output of said photodetector and a central processing unit for receiving the synchronizing signal output from said synchronizing signal generating circuit and controlling the light emission timings of said semiconductor lasers independently by means of said laser drive circuits.

37. An electrophotographic printer according to claim 27, wherein said optical deflector is a polygon mirror.

38. An electrophotographic printer according to claim 27, wherein said optical system for incident light comprises, a collimator lens, an aperture control and a cylindrical lens.

39. An electrophotographic printer according to claim 27, wherein said imaging optical system comprises fθ lenses.

* * * * *

UNITED STATES PATENT AND TRADEMARK OFFICE
CERTIFICATE OF CORRECTION

PATENT NO. : 6,362,470 B1
DATED : March 26, 2002
INVENTOR(S) : Hiroki Yoshida et al.

It is certified that error appears in the above-identified patent and that said Letters Patent is hereby corrected as shown below:

Column 3,
Line 31, "paper;" should read -- paper; and --.

Column 5,
Line 8, "form" should read -- forms --.

Column 6,
Line 35, "a" should read -- an --.

Column 10,
Line 23, "staring" should read -- starting --.

Column 12,
Line 26, "a long" should read -- along --.

Column 13,
Line 54, "claim 20," should read -- claim 20, wherein --.

Column 16,
Line 12, "claim 33," should read -- claim 33, wherein --; and
Line 35, "comprises," should read -- comprises --.

Signed and Sealed this

Fifteenth Day of April, 2003

JAMES E. ROGAN
*Director of the United States Patent and Trademark Office*